United States Patent [19]

Gosden

[11] 4,007,240
[45] Feb. 8, 1977

[54] SUPPORTING ARRANGEMENTS FOR POROUS DIFFUSERS
[75] Inventor: John Gosden, Maidstone, England
[73] Assignee: Reed International Limited, London, England
[22] Filed: Dec. 1, 1975
[21] Appl. No.: 636,787
[30] Foreign Application Priority Data
Dec. 6, 1974 United Kingdom ............ 52901/74
[52] U.S. Cl. .............................. 261/122; 210/220
[51] Int. Cl.² ......................................... B01F 3/04
[58] Field of Search .......... 138/106, 107, 177, 178; 210/220, 221 R; 211/176; 239/145, 542, 547; 248/74 A, 221; 261/122

[56] References Cited
UNITED STATES PATENTS

| 2,609,418 | 9/1952 | Binns et al. | 248/221 R X |
| 2,639,131 | 5/1953 | Coombs | 261/122 |
| 3,083,953 | 4/1963 | Langdon et al. | 261/122 |
| 3,242,072 | 3/1966 | Walker | 210/220 X |
| 3,501,133 | 3/1970 | Dreier et al. | 210/220 X |
| 3,518,831 | 7/1970 | Tibbals, Jr. et al. | 239/542 X |
| 3,532,272 | 10/1970 | Branton | 261/122 X |
| 3,755,764 | 8/1973 | Suzuki | 248/74 A X |

FOREIGN PATENTS OR APPLICATIONS

| 558,462 | 9/1932 | Germany | 261/122 |
| 93,725 | 12/1938 | Sweden | 248/221 D |
| 348,125 | 9/1960 | Switzerland | 261/122 |

Primary Examiner—Charles N. Hart
Assistant Examiner—Robert H. Spitzer
Attorney, Agent, or Firm—Pollock, VandeSande & Priddy

[57] ABSTRACT

A supporting arrangement for supporting a porous diffuser over a discharge opening of a gas supply pipe comprises a diffuser supporting body which defines a chamber with the porous diffuser and which connects with the discharge opening whereby gas is supplied to the chamber from the pipe. The diffuser supporting body has downwardly extending limbs which straddle the gas supply pipe and positively locate with the pipe in order to mount the supporting body on the pipe.

7 Claims, 4 Drawing Figures

SUPPORTING ARRANGEMENTS FOR POROUS DIFFUSERS

This invention relates to supporting arrangements for supporting porous diffusers, more particularly, but not exclusively, of the kind having a depending peripheral rim. Thus the diffusers may be dome-shaped or of other inverted dish form with straight or curved sides defining the rim. The purpose of the supporting arrangement is to support a diffuser over a gas discharge opening of a gas supply pipe. The diffusers may be, for example, made of carborundum.

The invention has advantageous application in purification systems for sewage sludge, the gas, i.e. air, from the gas-discharge openings being broken up by the diffusers so that it passes through the sludge in the form of small bubbles.

In one known arrangement for diffusing air into sewage sludge, an air supply pipe extends along the bottom of a treatment tank and the porous diffusers are positioned over discharge openings provided at intervals along the pipe. The object of the present invention is to provide an improved arrangement for supporting the diffuser on such an air supply pipe.

According to the invention there is provided a supporting arrangement for supporting a porous diffuser over a gas discharge opening of a gas supply pipe, wherein said supporting arrangement comprises a diffuser supporting body, which:

a. is adapted to locate the periphery of said diffuser so that a gas chamber is defined between the diffuser and said supporting body, b. is adapted to locate with said gas discharge opening of said gas supply pipe whereby gas can be supplied from said gas discharge opening to said chamber, and c. has downwardly extending limbs which are adapted to straddle said gas supply pipe, said limbs being provided with means which are adapted to positively locate with said gas supply pipe.

One diffuser supporting arrangement in accordance with the invention will now be described by way of example with reference to the accompanying drawings in which.

Figure 1:
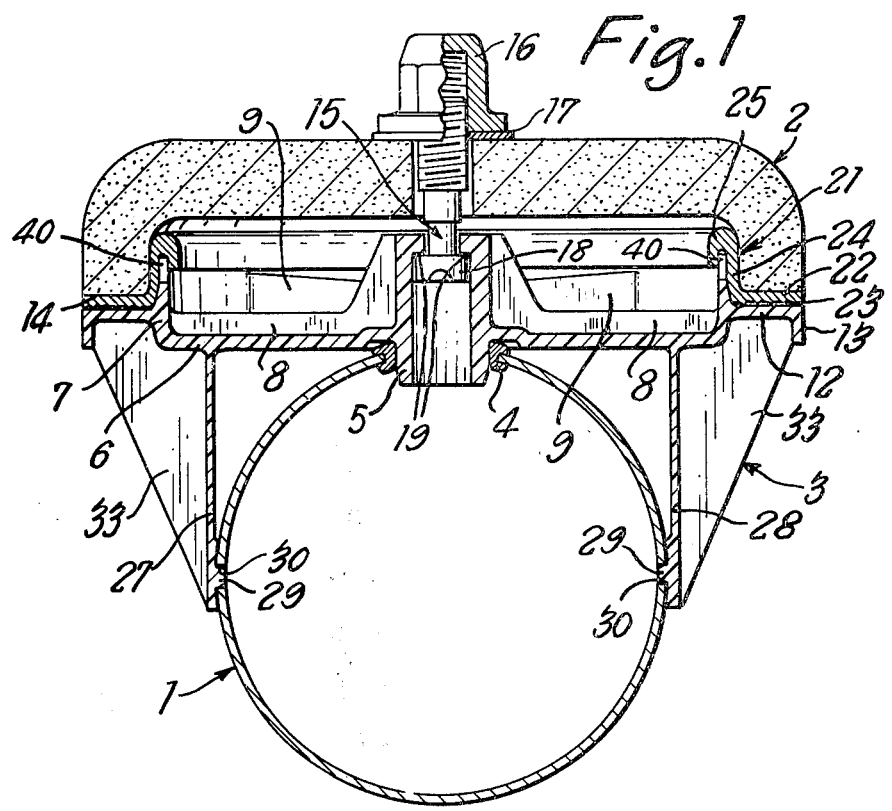
FIG. 1 is a cross-sectional view of the diffuser, and supporting arrangement mounted on an air supply pipe.

Referring to the drawings, an air supply pipe is shown at 1, a diffuser at 2 and a diffuser supporting arrangement at 3.

Figure 3:
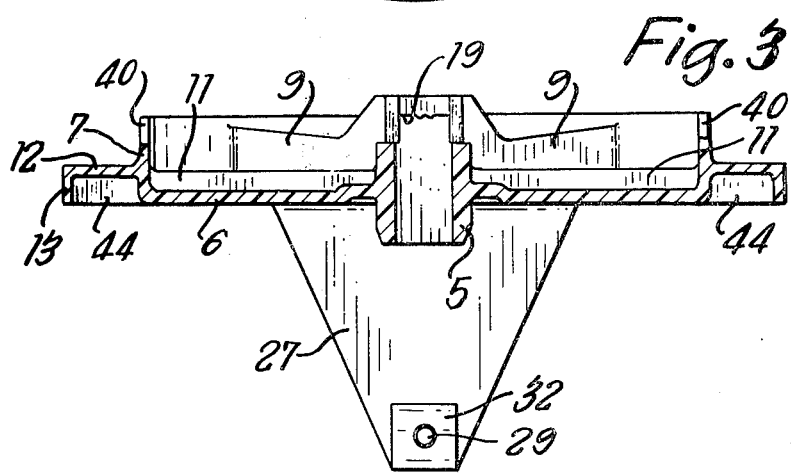
FIG. 3 is a section on the line III—III of FIG. 2.
Figure 2:
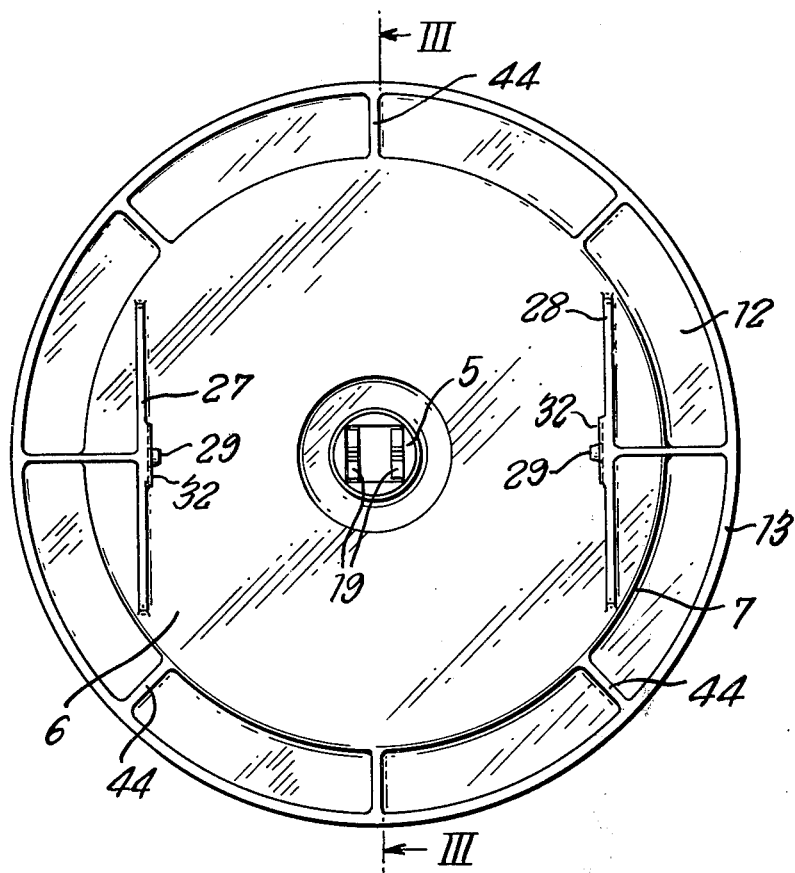
FIG. 2 is an underneath plan view of the diffuser supporting body.
Figure 4:
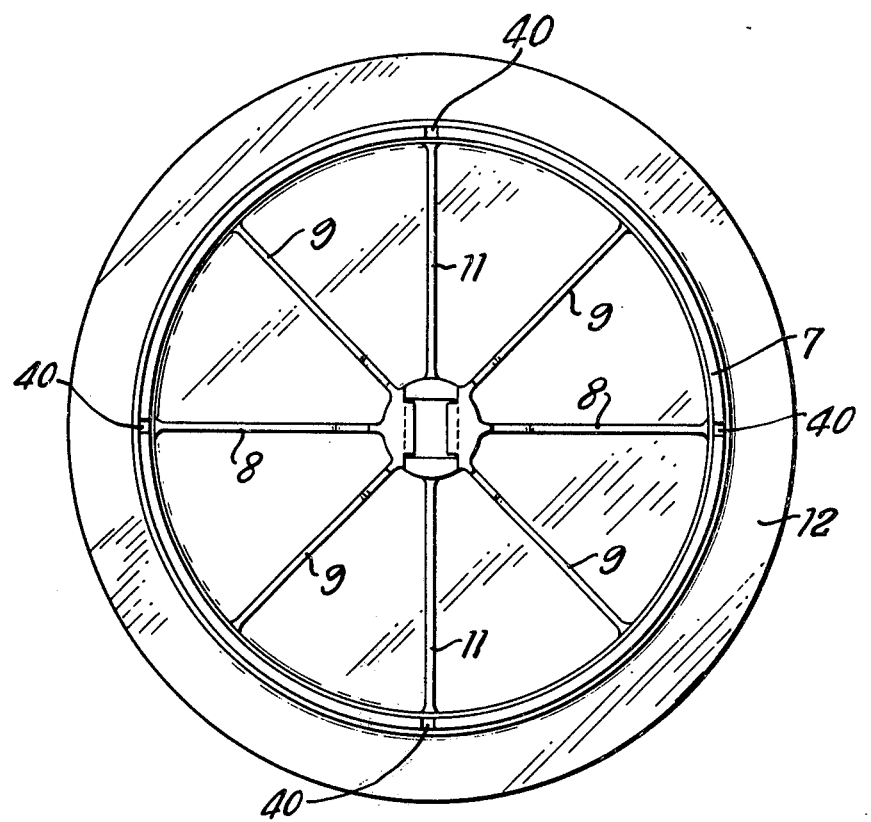
FIG. 4 is a top plan view of the diffuser supporting body.

The air supply pipe 1 has an air outlet hole whose periphery is fitted with a sealing grommet 4. The supporting arrangement 3 comprises a one piece supporting body of moulded plastics material having a central hollow cylindrical boss 5 which has a square sectioned bore through it and which locates in the air outlet hole and seals with the grommet 4. Extending from the boss 5 at a position just above the grommet is a circular plate 6. An upstanding wall 7 extends around the periphery of the plate 6. Reinforcing webs 8, 9 and 11 of differing profile are provided on the plate 6 and extend between boss 5 and wall 7. The upper edge of the wall 7 has four slits 40 cut in it at 90°to to each other. Extending from the outer surface of the wall 7 is an annular diffuser supporting flange 12 with a down-turned outer rim 13. Reinforcing webs 44 (see FIGS. 2 and 3) extend between the wall 7 and rim 13.

The diffuser 2, which is of inverted dish form rests by the lower edge 14 of its rim on the flange 12 through sealing means and is clamped in position by a bolt 15 whose shank passes through a central hole in the diffuser 2 and a cap-type nut 16 which clamps on to the top of the diffuser 2 through a sealing washer 17. The head 18 of the bolt 15 locates within the boss 5 and engages internal shoulders 19 at the upper end of the boss. As can be best appreciated from FIGS. 2 and 3 the top of the boss 5 is cut away so that the bolt 15 can be fitted, in its vertical position with the head 18 lowermost, by sliding its head 18 under the shoulders 19. The bolt 15 can not rotate since its head which is square locates against the flats provided by the square sectioned bore in the boss 5.

The sealing means between the diffuser 2 and the flange 12 of the supporting body comprises an annular sealing gasket 21 having a first web 22 which is sandwiched between the lower edge 14 of the diffuser rim and the supporting flange 12. The web 22 has on its undersurface (and optionally on its top surface) a plurality of annular ribs or vanes 23 which engage the surface of the flange 12. A second web extends substantially at right angles to the web 22 and lies between the outer surface of the wall 7 and the inner surface of the diffuser rim. At its upper end of the web 24 is shaped at 25 to lip over the upper edge of the wall 7.

The supporting body is mounted on the air supply pipe 1 through a pair of downwardly extending limbs 27 and 28 which straddle the pipe 1 and have small projections 29 at their lower ends in holes 30 in the pipe wall. As the limbs 27 and 28 are pushed down over the pipe 1 they will be splayed slightly by the projections 29 engaging the pipe. The plastics material of the limbs 27 and 28 provides the inherent resilience to permit this. Thus when the projections 29 align with the holes 30 they will snap into position in the holes 30. As can best be appreciated from FIGS. 2 and 3, the projections 29 each extend from the center of a pad 32 which engages the outside wall surface of the pipe 1. These pads 32 are slightly dished to facilitate the application of solvent or adhesive to the projections 29 and pads 32, in order to bond them to the pipe 1. Strengthening ribs 33 are provided on the limbs 27.

In operation air passes from the pipe 1 through the boss 5 and past the bolt head 18 into the air chamber between the upper surface of the plate 6 and diffuser 2 and thence through the diffuser. The slits 40 provide for a limited escape of air from the air chamber, this air forcing its way between the sealing gasket 21 and the supporting body 3. The clamping pressure on the sealing gasket 21 in such that with the diffuser and supporting arrangement submerged in a liquid, the size of the air bubbles escaping past the gasket is about the same as those escaping from the diffuser 2.

I claim:

1. In a gas diffusing system of the type comprising an elongated gas supply pipe having a gas discharge opening in a side wall thereof, a porous diffuser of substantially disc shape, and a unitary supporting element engaging the periphery of said diffuser and located between said diffuser and the exterior of said gas supply pipe adjacent said gas discharge opening for supporting said diffuser on said pipe in outwardly spaced relation thereto, said supporting element cooperating with said diffuser and said pipe to define a substantially enclosed gas chamber exterior of said pipe adjacent said gas discharge opening, the improvement wherein the side walls of said pipe define a pair of spaced recesses each of which is positionally displaced from said gas discharge opening on opposite sides thereof respectively, said unitary supporting element including a pair of spaced, load-bearing limbs positioned to straddle said gas supply pipe and adapted to be resiliently flexed away from one another as said limbs are pushed onto said pipe on opposite sides of said gas discharge opening respectively, and a pair of projections on said limbs respectively extending toward one another and spaced from one another by a distance less than the length of the chord between said spaced recesses in said pipe whereby said projections snap into and interengage with said recesses respectively when the limbs of said supporting element are pushed onto said pipe thereby to positively locate said supporting element relative to said pipe.

2. The improvement of claim 1 wherein said projections are located on pads provided adjacent the free ends of said limbs, said pads having dished surfaces facing said pipe respectively and from which said projections extend toward one another.

3. The improvement of claim 1 wherein said unitary supporting element includes a hollow boss communicating with the gas discharge opening of said pipe, a plate member formed integrally with and surrounding said hollow boss, an upstanding wall extending around the periphery of said plate member, and an annular flange extending around the outside of said wall, said diffuser including a dependinfg peripheral rim the lower edge of which rests on said annular flange so that said gas chamber is formed between the upper surface of said plate member and the under surface of said diffuser.

4. The improvement of claim 3 wherein a sealing gasket is positioned between said supporting element and said diffuser, said sealing gasket having a first web disposed between said annular flange and the lower edge of said diffuser rim, a second web disposed between said upstanding wall and the inner surface of said rim, and a portion which lips over the upper edge of said upstanding wall.

5. The improvement of claim 4, wherein a plurality of slits are provided in the upper edge of said upstanding wall to permit a limited escape of gas from said gas chamber past said sealing gasket.

6. The improvement of claim 3, wherein the lower edge of the diffuser rim is clamped against said annular flange by a clamping arrangement comprising a bolt having a head located in said hollow boss and a shank which passes through said diffuser, and a clamping nut which screws on to said bolt and engages the outside of said diffuser through a sealing gasket.

7. The improvement of claim 6 wherein the top of said hollow boss is provided with shoulders under which the head of said bolt is trapped, the top of said boss being cut away to permit said bolt head to be slid under said shoulders with said bolt shank extending vertically.

* * * * *